United States Patent
Abenroth

(10) Patent No.: US 7,632,051 B1
(45) Date of Patent: Dec. 15, 2009

(54) MOTORCYCLE TRAILERING STABILIZERS

(76) Inventor: Jon C. Abenroth, 2289 Pea Ridge Rd., Scottsville, KY (US) 42164

( * ) Notice: Subject to any disclaimer, the term of this patent is extended or adjusted under 35 U.S.C. 154(b) by 334 days.

(21) Appl. No.: 11/807,576

(22) Filed: May 30, 2007

(51) Int. Cl.
*B60P 7/08* (2006.01)
(52) U.S. Cl. .................. 410/3; 410/7; 410/23
(58) Field of Classification Search ........ 410/2, 410/3, 7, 9–12, 18, 19, 22, 23, 97, 100; 211/105.3; 224/402, 403, 534, 554, 568, 924; 248/354.5, 248/499, 500
See application file for complete search history.

(56) References Cited

U.S. PATENT DOCUMENTS

| | | | |
|---|---|---|---|
| 3,923,220 A | 12/1975 | Marcyan | |
| 4,078,821 A | 3/1978 | Kitterman | |
| 6,065,914 A | 5/2000 | Fotou | |
| 6,715,972 B2 | 4/2004 | Jackson, Sr. | |
| 6,932,550 B1 * | 8/2005 | Hope | 410/3 |

* cited by examiner

*Primary Examiner*—Stephen Gordon
(74) *Attorney, Agent, or Firm*—Patent & Trademark Services, Inc; Joseph H. McGlynn

(57) ABSTRACT

A stabilizing rod system for securing a motorcycle to a trailer during transportation. The system has telescoping tubes which can be adjusted to fit different dimensions and a hook for securing the tubes to the trailer and a second hook for securing the tubes to the motorcycle.

10 Claims, 2 Drawing Sheets

MOTORCYCLE TRAILERING STABILIZERS

BACKGROUND OF THE INVENTION

This invention relates, in general, to stabilizers, and, in particular, to stabilizers for securing a vehicle during transport.

DESCRIPTION OF THE PRIOR ART

In the prior art various types of stabilizing devices have been proposed. For example, U.S. Pat. No. 6,065,914 to Fotou discloses a stabilizing rod system for securing a motorcycle to a trailer comprising telescoping tubes which can be adjusted to fit different dimensions and a hook for securing the rod to the trailer and a hook for securing the rod to the handlebars of a motorcycle. However, the hooks are exposed and are not protected by the sleeves of the present invention.

U.S. Pat. No. 3,923,220 to Marcyan discloses a stabilizing rod system for securing a motorcycle to a trailer comprising telescoping tubes which can be adjusted by means of threaded rods and wing nuts to fit different dimensions.

U.S. Pat. No. 4,078,821 to Kitterman discloses a stabilizing rod system for securing a motorcycle to a trailer comprising telescoping tubes which can be adjusted by means of threaded rods to fit different dimensions.

U.S. Pat. No. 6,715,972 to Jackson, Sr. discloses a triangular stabilizing system for securing a motorcycle to a trailer.

SUMMARY OF THE INVENTION

The present invention is directed to a stabilizing rod system for securing a motorcycle to a trailer during transportation. The system has telescoping tubes which can be adjusted to fit different dimensions and a hook for securing the tubes to the trailer and a second hook for securing the tubes to the motorcycle.

It is an object of the present invention to provide a new and improved stabilizing system for transporting vehicles.

It is an object of the present invention to provide a new and improved stabilizing system for transporting vehicles which protects the transported vehicle.

It is an object of the present invention to provide a new and improved stabilizing system for transporting vehicles which is easily installed and uninstalled.

These and other objects and advantages of the present invention will be fully apparent from the following description, when taken in connection with the annexed drawings.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
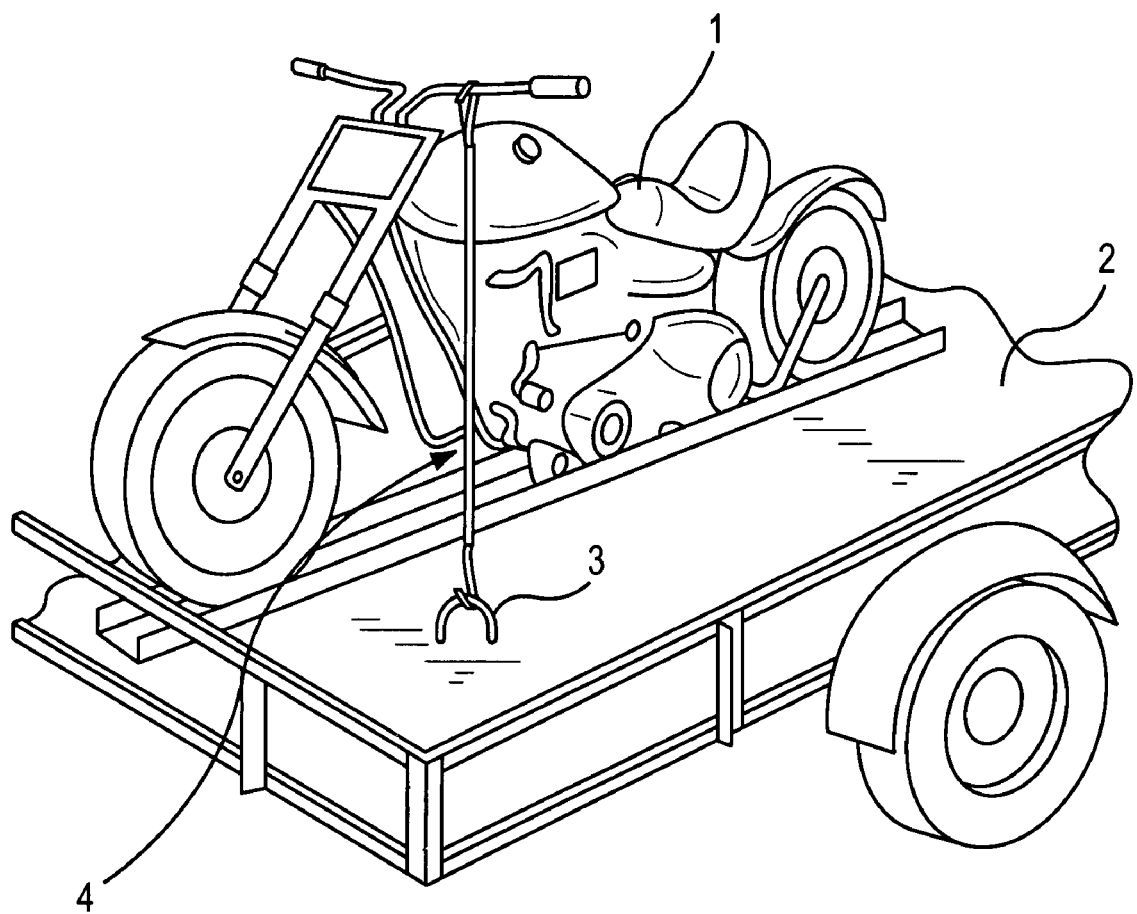
FIG. 1 is perspective view of the present invention securing a motorcycle to a trailer.

Referring now to the drawings in greater detail, FIG. 1 shows a motorcycle 1 secured to a trailer 2 by the present invention 4 for transportation of the motorcycle. The stabilizing rod 4 of the present invention is secured at one end to the handlebars of the motorcycle and at the other end to a securing ring 3 fastened in any conventional manner to the floor of the trailer 2. Also, it should be noted that normally two stabilizing rods 4 (one on either side of the motorcycle) would be used, however, only one is shown in FIG. 1 for clarity. The handle bar hooks 17 (see FIGS. 2 and 3) are locked onto the motorcycle and can not be dislodged due to extreme road conditions and/or negative pressure caused by slack or undue pressure on the motorcycle forks which can be caused by the trailer 2 encountering swerving or extreme bumps, braking or pot holes.

Figure 2:
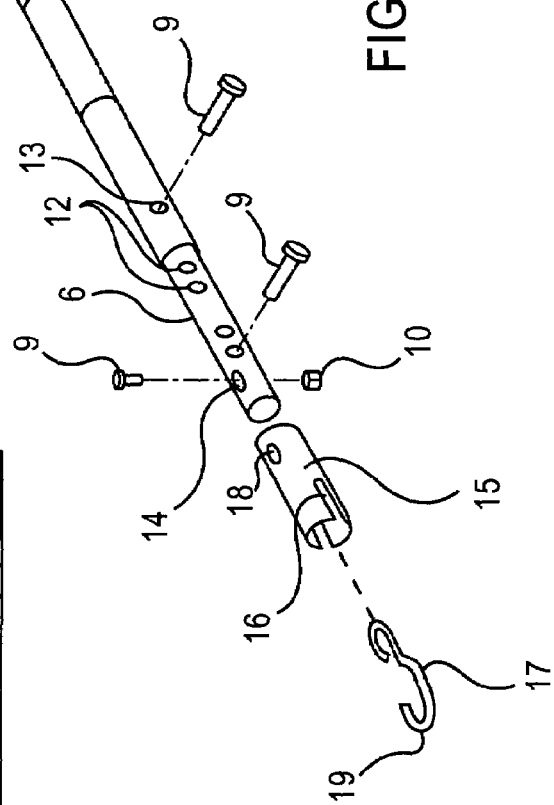
FIG. 2 is an exploded view of the present invention.

As shown in FIG. 2, the present invention comprises a pair of telescoping tubes 5, 6. The tubes have a plurality of apertures therethrough. Tube 5 has a single aperture 13 at a first end, and the tube 6 has a plurality of apertures 12 at one end. The combined length of the tubes 5, 6 can be adjusted by aligning one of the apertures 12 with the aperture 13 and passing a bolt, or other securing means, 9 through the aligned apertures.

The second end of the tube 5 has an aperture 11 passing through. A cover 7 is placed over the second end of the tube 5 and an aperture 12 in the cover is aligned with an aperture 11 in the end of the tube 5. A snap hook 8 is placed in the open end of the tube 5 and a bolt, or other securing means, 9 is passed through the aperture 12 in the cover, through the hook 8 and then through the end of the tube 5. The bolt is secured with a nut 10 to hold the snap hook, or securing means, 8 to the second end of the tube 5. The snap hook 8 will engage the securing ring 3 and thus hold the stabilizing rod 4 to the trailer 2. The cover 7 will cover most of the snap hook 8 leaving just enough exposed to secure the hook to the securing ring 3. The cover will protect the hook from being accidentally damaged by, for example, being struck by foreign objects, and will help protect the hook from the elements.

Figure 3:
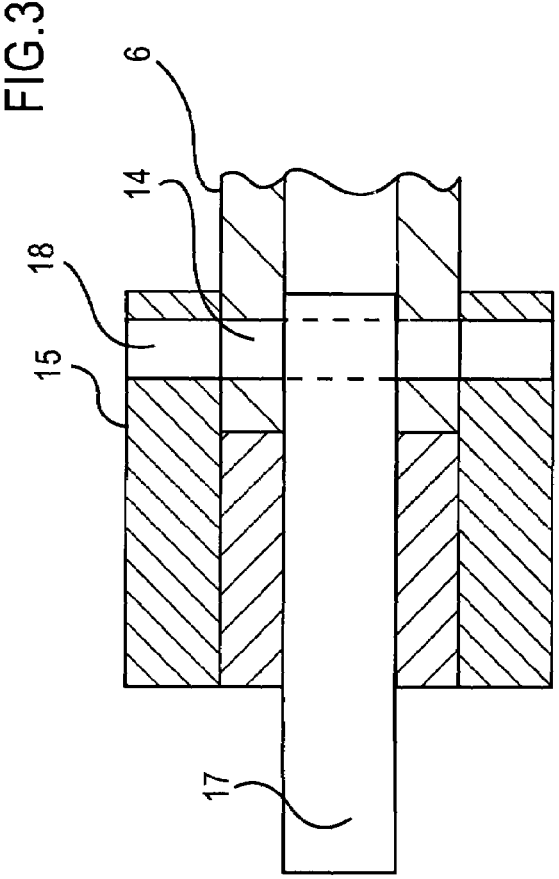
FIG. 3 is a partial cross-sectional view of one end of the present invention.

The other end of the tube 6 has an aperture 14 which will accept a bolt, or other securing means, 9 to fasten the locking collar or slotted cover 15 and hook 17 in a similar manner to the hook 8 and non-slotted cover 7. In order to secure the hook 17 to the other end of tube 6, the hook will be placed inside the cover with the curved portion 19 of the hook placed in the slot 16. the locking collar 15 will cover most of the length of the hook 17, as shown in FIG. 3. Then they will be placed on the end of the tube with the cover 15 on the outside of the tube and the hook on the inside of the tube, and a bolt, or other securing means, 9 will be passed through the cover, the tube and the hook to secure them all together. The locking collar, because of the slot 16, will slide as far as possible up to the motorcycle handlebars thus locking the hook securely onto the handle bars. The locking collar 15 protects the end of the tube 6 and acts like a bumper guard for the hook as it conceals and protects the hook.

In order to use the present invention, the hook 8 will be secured to the securing ring 3. The length of the telescoping tubes 5, 6 will be adjusted so it is slightly shorter than the distance to the handlebars. Next the motorcycle fork will be compressed so the hook 17 can be looped around the handlebars. The second stabilizing rod 4 will be placed on the motorcycle in the same manner.

Although the Motorcycle Trailering Stabilizers and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. Trailering stabilizers for securing a vehicle to a trailer comprising:
   a pair of telescoping tubes,
   means for adjusting a relative length of said telescoping tubes, and
   means on one end of said pair of telescoping tubes for attachment to said vehicle, and
   means on a second end of said pair of telescoping tubes for attachment to said trailer, and
   said one end having means for covering and protecting said means on said one end of said pair of telescoping tubes for attachment to said vehicle, and
   said second end having means for covering and protecting said means on said second end of said pair of telescoping tubes for attachment to said trailer, and
   wherein said means for covering and protecting said means on said second end of said pair of telescoping tubes for attachment to said trailer comprises a cover,
   said cover is placed over an outside of said second end of said pair of telescoping tubes, and
   said means on said second end of said pair of telescoping tubes for attachment to said trailer is placed inside said second end of said pair of telescoping tubes, and
   means for securing said cover, said second end of said pair of telescoping tubes, and said means for attachment to said trailer together.

2. The trailering stabilizers for securing a vehicle to a trailer as claimed in claim 1 wherein said means for attachment to said vehicle is a hook.

3. The trailering stabilizers for securing a vehicle to a trailer as claimed in claim 1 wherein said means for covering and protecting said means on said one end of said pair of telescoping tubes for attachment to said trailer has an open ended slot extending from one end.

4. The trailering stabilizers for securing a vehicle to a trailer as claimed in claim 2, wherein said hook has a curved portion, and
   said curved portion fits into an open ended slot extending from one end of said means for covering and protecting said means on said one end of said pair of telescoping tubes for attachment to said vehicle.

5. Trailering stabilizers for securing a vehicle to a trailer comprising:
   a pair of telescoping tubes,
   means for adjusting a relative length of said telescoping tubes, and
   means on one end of said pair of telescoping tubes for attachment to said vehicle, and
   means on a second end of said pair of telescoping tubes for attachment to said trailer, and
   said one end having means for covering and protecting said means on said one end of said pair of telescoping tubes for attachment to said vehicle, and
   said second end having means for covering and protecting said means on said second end of said pair of telescoping tubes for attachment to said trailer, and
   wherein said means for covering and protecting said means on said one end of said pair of telescoping tubes for attachment to said vehicle comprises a cover,
   said cover is placed over an outside of said one end of said pair of telescoping tubes, and
   said means on said one end of said pair of telescoping tubes for attachment to said vehicle is placed inside said one end of said pair of telescoping tubes, and
   means for securing said cover, said one end of said pair of telescoping tubes and said means for attachment to said vehicle together.

6. Trailering stabilizers for securing a vehicle to a trailer comprising:
   a pair of telescoping tubes,
   means for adjusting a relative length of said telescoping tubes, and
   a hook on one end of said pair of telescoping tubes for attachment to said vehicle, and
   a second hook on a second end of said pair of telescoping tubes for attachment to said trailer, and
   said one end having means for covering and protecting said hook, and
   said second end having means for covering and protecting said second hook, and
   wherein said means for covering and protecting said second hook comprises a cover,
   said cover is placed over an outside of said second end of said pair of telescoping tubes, and
   said hook is placed inside said one end of said pair of telescoping tubes, and
   means for securing said cover, said second end of said pair of telescoping tubes, and said second hook together.

7. The trailering stabilizers for securing a vehicle to a trailer as claimed in claim 6, wherein said means for covering and protecting said comprises a second cover,
   said second cover is placed over an outside of said one end of said pair of telescoping tubes, and
   said hook is placed inside said one end of said pair of telescoping tubes, and
   means for securing said second cover, said one end of said pair of telescoping tubes and said hook together.

8. The trailering stabilizers for securing a vehicle to a trailer as claimed in claim 7, wherein said second cover has an open ended slot extending from one end.

9. The trailering stabilizers for securing a vehicle to a trailer as claimed in claim 8, wherein said hook has a curved portion, and
   said curved portion fits into said open ended slot.

10. The trailering stabilizers for securing a vehicle to a trailer as claimed in claim 9, wherein said hook has a length, and
    said second cover extends over most of said length of said hook.

* * * * *